US011421736B2

(12) United States Patent
Hitomi et al.

(10) Patent No.: US 11,421,736 B2
(45) Date of Patent: Aug. 23, 2022

(54) ROLLING BEARING UNIT

(71) Applicant: NSK LTD., Tokyo (JP)

(72) Inventors: Naohiro Hitomi, Kanagawa (JP);
Daisuke Gunji, Kanagawa (JP);
Hiroyasu Kumagai, Kanagawa (JP);
Ricardo Rodriguez Lopez, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/257,154

(22) PCT Filed: Jul. 3, 2019

(86) PCT No.: PCT/JP2019/026425
§ 371 (c)(1),
(2) Date: Dec. 30, 2020

(87) PCT Pub. No.: WO2020/009140
PCT Pub. Date: Jan. 9, 2020

(65) Prior Publication Data
US 2021/0364043 A1 Nov. 25, 2021

(30) Foreign Application Priority Data
Jul. 4, 2018 (JP) .............................. JP2018-127332

(51) Int. Cl.
*F16C 41/00* (2006.01)
*F16C 33/72* (2006.01)
*B60B 27/00* (2006.01)

(52) U.S. Cl.
CPC ........ *F16C 33/723* (2013.01); *B60B 27/0047* (2013.01); *B60B 27/0073* (2013.01); *F16C 41/004* (2013.01); *F16C 2326/02* (2013.01)

(58) Field of Classification Search
CPC .... F16C 33/723; F16C 41/004; F16C 41/007; F16C 2326/02; B60B 27/0047; B60B 27/0068; B60B 27/0073
See application file for complete search history.

(56) References Cited

U.S. PATENT DOCUMENTS

| 2010/0001720 | A1 | 1/2010 | Mizutani et al. | |
|---|---|---|---|---|
| 2010/0162831 | A1* | 7/2010 | Kubokawa | G01L 5/0023 73/862.381 |
| 2015/0137803 | A1* | 5/2015 | Lee | G01D 5/12 324/207.25 |

FOREIGN PATENT DOCUMENTS

| DE | 195 47 096 A1 | 6/1997 |
|---|---|---|
| JP | 2000-211309 A | 8/2000 |

(Continued)

OTHER PUBLICATIONS

International Search Report of PCT/JP2019/026425 dated Aug. 13, 2019 [PCT/ISA/210].

(Continued)

*Primary Examiner* — Alan B Waits
(74) *Attorney, Agent, or Firm* — Sughrue Mion, PLLC

(57) ABSTRACT

A rolling bearing unit includes: an inner ring member having a recess on a first side in an axial direction, the recess being recessed toward a second side in the axial direction; an outer ring member disposed on the outer periphery side of the inner ring member; a rolling body disposed between the inner ring member and the outer ring member and rotatably supporting the inner ring member with respect to the outer ring member; a transmitter capable of transmitting at least one of electric power or a signal, at least a part of the transmitter being accommodated inside the recess of the inner ring member; and a covering member that is supported by the first side of the outer ring member in the axial (Continued)

direction, covers the first side of the inner ring member in the axial direction, and fixes the transmitter.

4 Claims, 4 Drawing Sheets

(56)  References Cited

FOREIGN PATENT DOCUMENTS

| | | | |
|---|---|---|---|
| JP | 2001-208763 A | | 8/2001 |
| JP | 2001-349899 A | | 12/2001 |
| JP | 2004-036816 A | | 2/2004 |
| JP | 2008241627 A | * | 10/2008 |
| JP | 2018-001769 A | | 1/2018 |
| WO | 93/22687 A1 | | 11/1993 |

OTHER PUBLICATIONS

Written Opinion of PCT/JP2019/026425 dated Aug. 13, 2019 [PCT/ISA/237].
Extended European Search Report dated Feb. 17, 2022, issued in European Application No. 19830760.5.

* cited by examiner

SECOND SIDE ← → FIRST SIDE

OUT ← → IN

ROLLING BEARING UNIT

CROSS REFERENCE TO RELATED APPLICATIONS

This application is a National Stage of PCT international application Ser. No. PCT/JP2019/026425 filed on Jul. 3, 2019 which designates the United States, incorporated herein by reference, and which is based upon and claims the benefit of priority from Japanese Patent Application No. 2018-127332 filed on Jul. 4, 2018, the entire contents of which are incorporated herein by reference.

FIELD

The present disclosure relates to a rolling bearing unit to support a vehicle wheel.

BACKGROUND

Conventional vehicle wheels are supported by a suspension through a rolling bearing unit. A structure in which the rolling bearing unit has a contactless power supply system is known (see Patent Literature 1).

The rolling bearing unit of Patent Literature 1 includes a power receiving coil provided on the inner side of a rotary-side inner ring in a vehicle width direction, and a covering member covering the inner side of the power receiving coil in the vehicle width direction. A power supply coil is disposed on the inner side of the covering member in the vehicle width direction.

CITATION LIST

Patent Literature

Patent Literature 1: Japanese Patent Application Laid-open Publication No. 2018-1769

Technical Problem

The rolling bearing unit of Patent Literature 1 has a power receiving coil disposed on the inner side, in the vehicle width direction, of the inner ring and has a power supply coil disposed on the inner side, in the vehicle width direction, of the covering member (cap) covering the power receiving coil. This structure increases the width of the rolling bearing unit along the vehicle width direction and thus increases the overall size of the rolling bearing unit.

For the foregoing reasons, there is a need for a rolling bearing unit the structure of which is advantageous in reducing the size of the unit.

SUMMARY

A rolling bearing unit according to a first aspect of the present invention, includes: an inner ring member having a recess on a first side in an axial direction along a rotation axis, the recess being recessed toward a second side in the axial direction; an outer ring member disposed on an outer periphery side of the inner ring member; a rolling body disposed between the inner ring member and the outer ring member and rotatably supporting the inner ring member with respect to the outer ring member; a transmitter capable of transmitting at least one of electric power or a signal, at least a part of the transmitter being accommodated inside the recess of the inner ring member; and a covering member that is supported by the first side of the outer ring member in the axial direction, covers the first side of the inner ring member in the axial direction, and fixes the transmitter.

According to the first aspect of the present invention, at least a part of the transmitter is accommodated inside the recess of the inner ring member along the axial direction, and thus the first side of the inner ring member in the axial direction is kept from projecting in the axial direction. This can reduce the entire length of the rolling bearing unit in the axial direction, thereby preventing an increase in the overall size of the unit.

In a rolling bearing unit according to a second aspect of the present invention, the covering member has a through-hole, the transmitter has a projection on the first side in the axial direction, the projection projects toward the first side and is fittable into the through-hole of the covering member, and the transmitter is fixed to the covering member with the projection fitted in the through-hole.

According to the second aspect of the present invention, the transmitter is connected with the covering member with the projection fitted in the through-hole, which enables effective holding of the transmitter. Since the inner ring member, which is a rotary member, is disposed on the outer periphery side of the transmitter, which is a stationary member, it is difficult to hold the transmitter. To address this, the transmitter is connected with the covering member, which is a stationary member. This structure enables effective holding of the transmitter.

In a rolling bearing unit according to a third aspect of the present invention, a center axis of the transmitter is along the rotation axis of the inner ring member with the projection fitted in the through-hole.

According to the third aspect of the present invention, the center axis of the transmitter is along the rotation axis of the inner ring member. This alignment can reduce interference of the inner peripheral surface of the recess with the outer peripheral surface of the transmitter during rotation of the inner ring member.

Furthermore, this alignment can reduce the distance between the inner peripheral surface of the recess of the inner ring member and the outer peripheral surface of the transmitter in the radial direction, which allows the inner ring member to have a larger thickness, thereby increasing the rigidity thereof. The center axis of the transmitter can be aligned with the rotation axis of the inner ring member by carrying out a simple task such as fitting the projection of the transmitter in the through-hole of the covering member.

In a rolling bearing unit according to a fourth aspect of the present invention, a sealing member annularly continuous around the rotation axis is interposed between a portion on an outer periphery side of the projection of the transmitter on the first side in the axial direction and a portion on an outer periphery side of the through-hole of the covering member.

According to the fourth aspect of the present invention, the sealing member provides waterproof even when water enters through the gap between the projection and the through-hole.

More specifically, with the projection fitted in the through-hole, a gap can be produced between the projection and the through-hole, and water can enter through the gap. The sealing member in an annular shape is therefore interposed between the outer periphery side of the projection and the outer periphery side of the through-hole, thereby, if water enters through the gap, stopping the water from further spreading to the outer peripheral side from the sealing member.

Advantageous Effects of Invention

According to an aspect of the present invention, a size-reduced rolling bearing unit is obtained.

DESCRIPTION OF EMBODIMENTS

While embodiments according to the present invention will now be described with reference to the drawings, the present invention is not limited to the embodiments. Requirements of the following embodiments can be combined as appropriate. Not all of the components may be necessarily used.

In the following description, the rotation axis of an inner ring member will be indicated as AX. A direction along the rotation axis AX will be referred to as an "axial direction" or a "left-right direction", and a direction orthogonal to the rotation axis AX will be referred to as a "radial direction". Furthermore, a "first side in the axial direction" will be referred to as an "inner side (IN side) in the vehicle width direction, and a "second side in the axial direction" will be referred to as an "outer side (OUT side) in the vehicle width direction". The front side of the vehicle will be referred to as an FR side, and the rear side will be referred to as an RR side.

Figure 1:
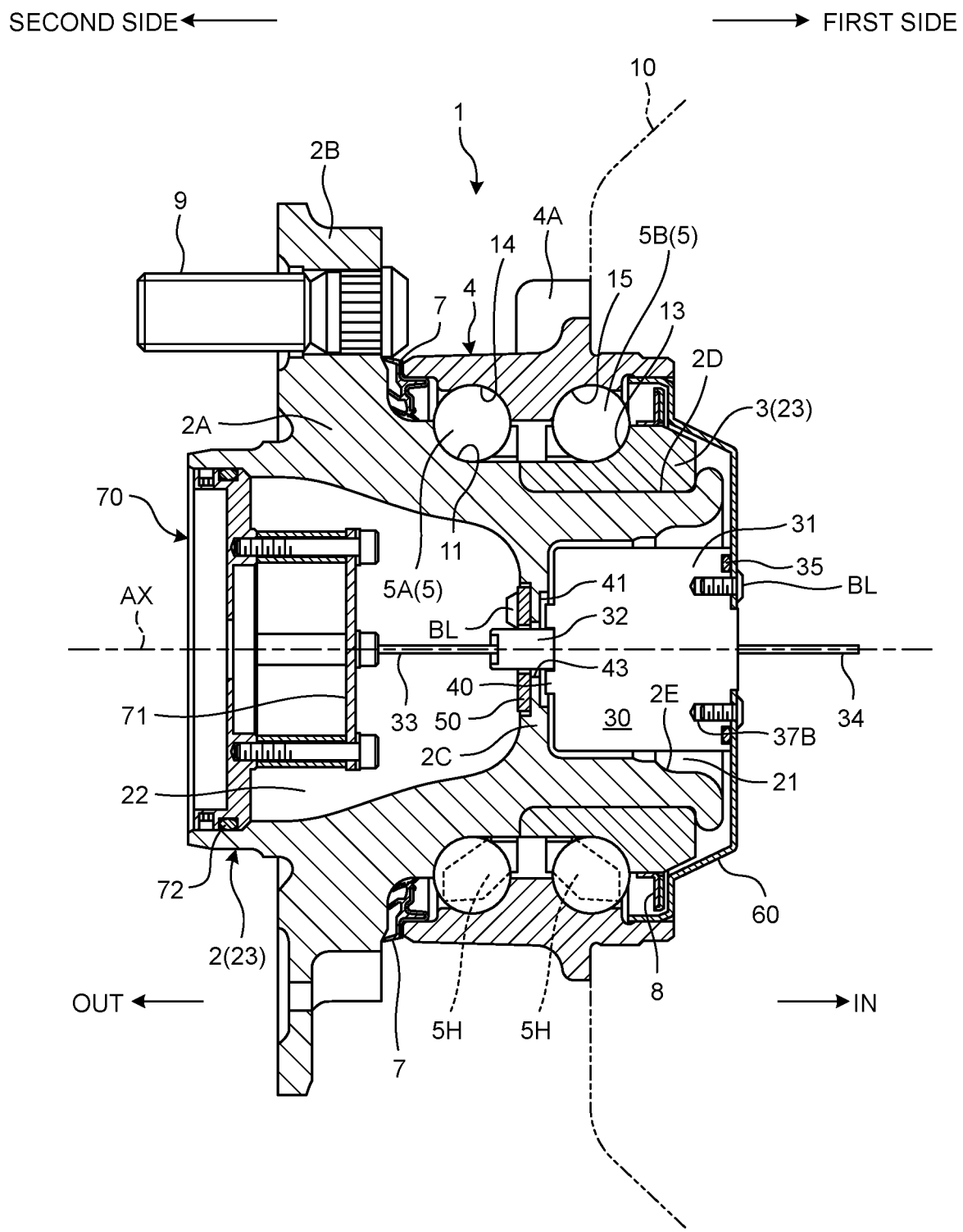
FIG. 1 is a sectional view of a rolling bearing unit according to an embodiment.
Figure 2:
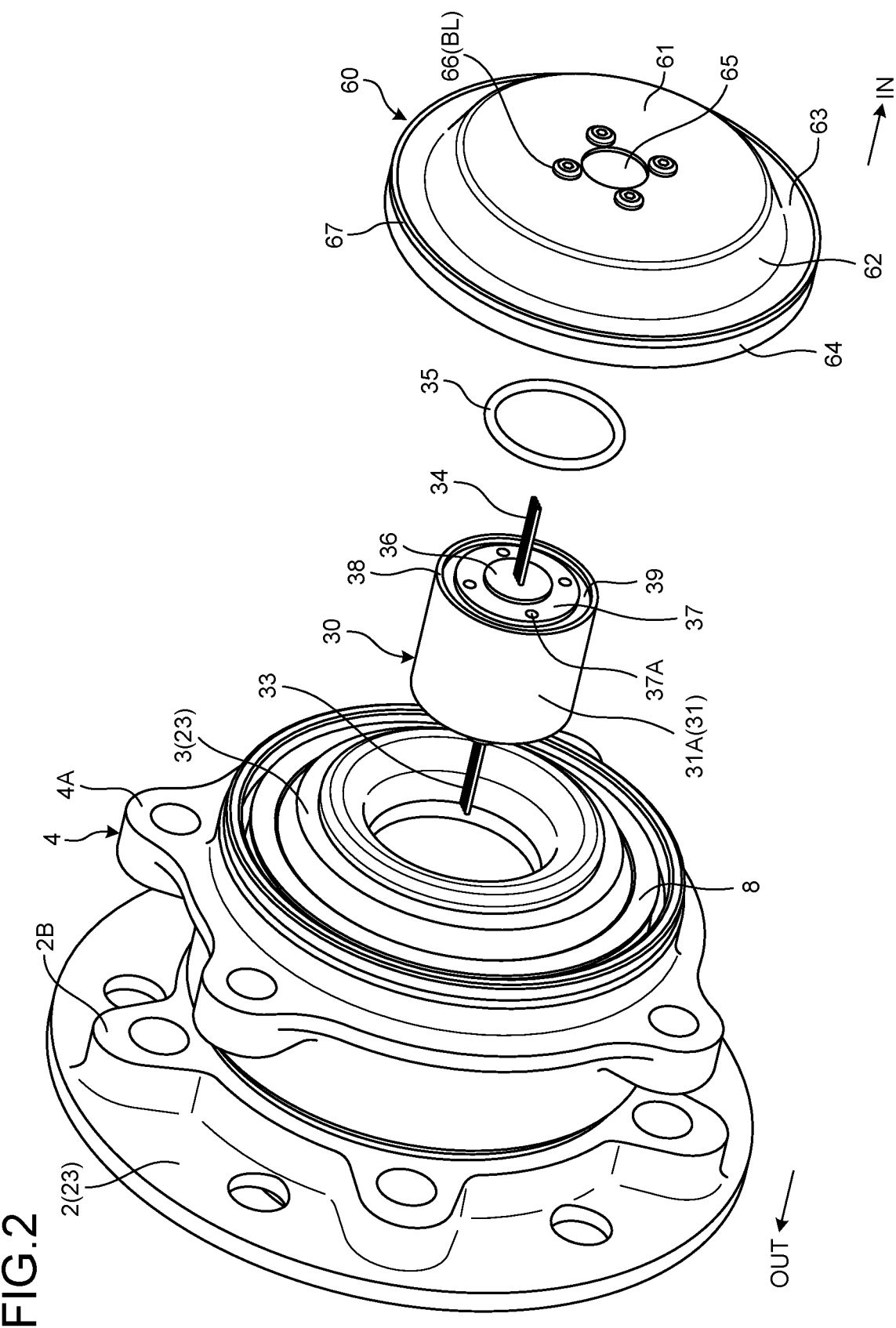
FIG. 2 is an exploded perspective view of the rolling bearing unit of FIG. 1.
Figure 3:
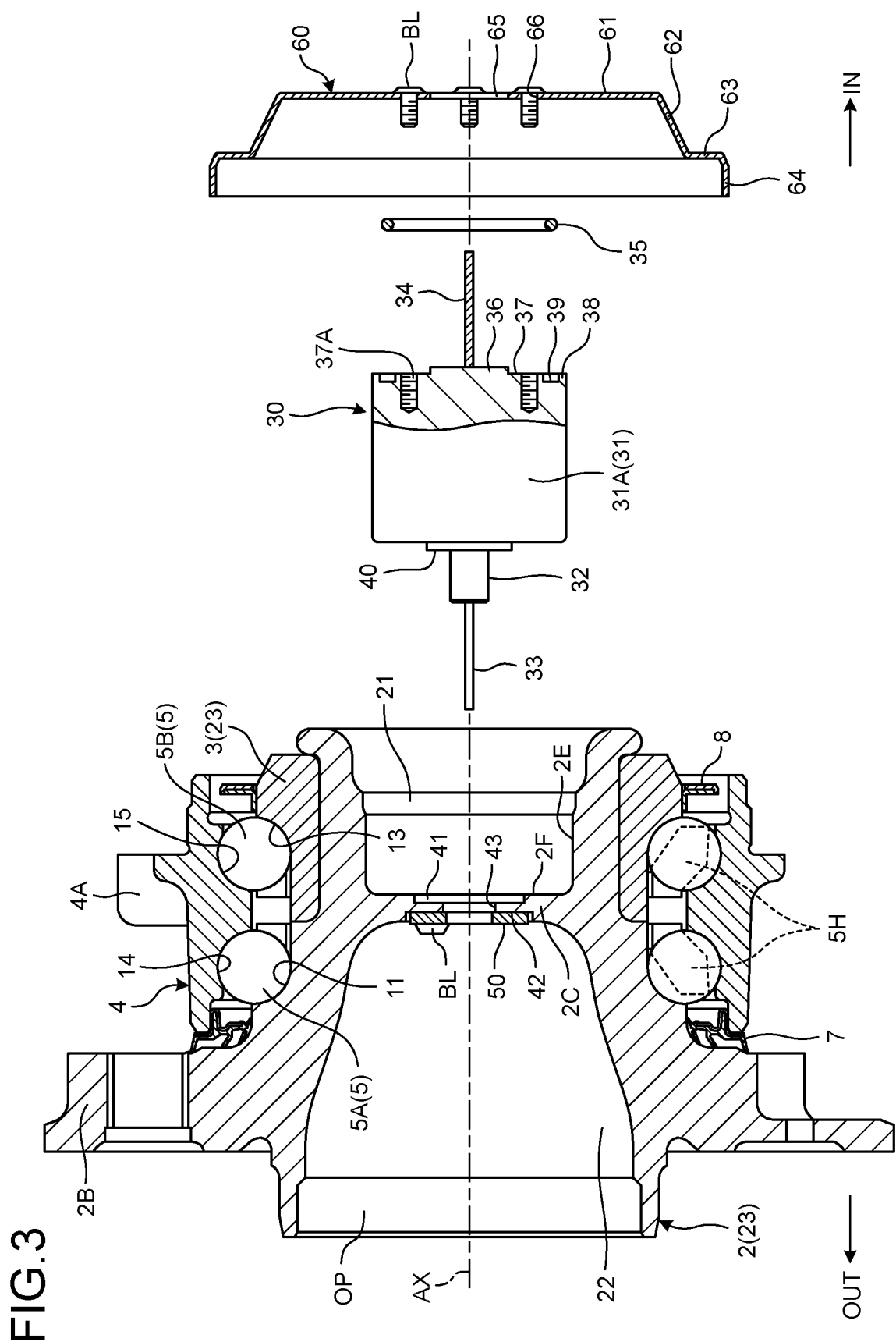
FIG. 3 is a sectional view of FIG. 2.
Figure 4:
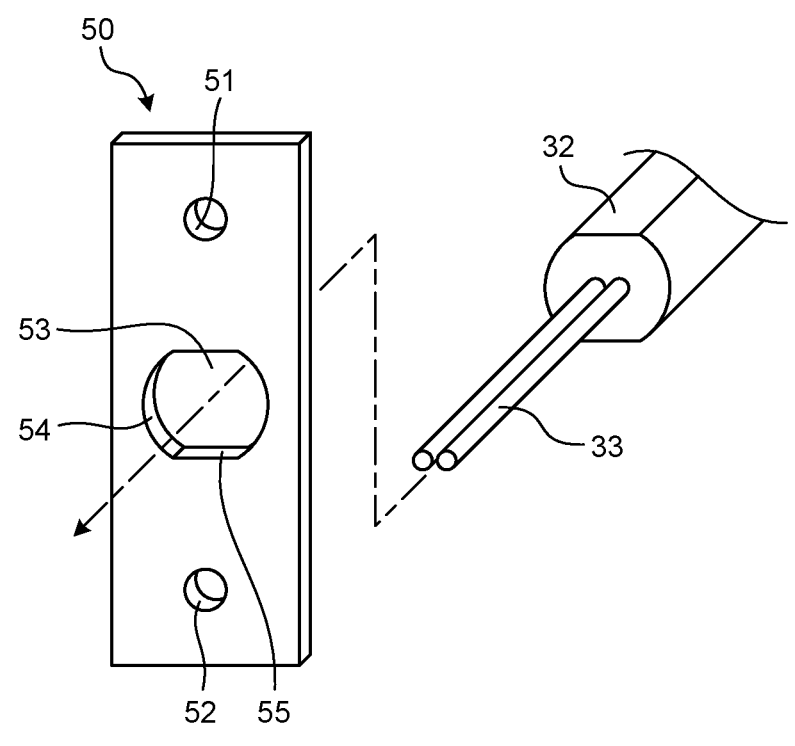
FIG. 4 is an exploded perspective view of a rotary unit of a transmitter and a connection plate.

FIG. 1 is a sectional view of a rolling bearing unit (hub bearing) 1 according to an embodiment. FIG. 2 is an exploded perspective view of the rolling bearing unit 1 of FIG. 1. FIG. 3 is a sectional view of FIG. 2. FIG. 4 is an exploded perspective view of a rotary-side transmission part 32 of a transmitter 30 and a connection plate 50.

As illustrated in FIG. 1 to FIG. 3, the rolling bearing unit 1 rotatably supports a wheel of a vehicle while being supported by a suspension 10 of the vehicle. In other words, the wheel of the vehicle is supported by the suspension 10 through the rolling bearing unit 1.

The rolling bearing unit 1 includes an inner ring member 23, an outer ring member 4 (outer ring), rolling bodies 5, the transmitter 30, and a first cover 60 (covering member). The inner ring member 23 is rotatable about the rotation axis AX. The outer ring member 4 (outer ring) in the form of a cylinder is disposed on the outer side (outer periphery side) of the inner ring member 23 in the radial direction and is supported while remaining stationary.

The rolling body 5 is disposed between the inner ring member 23 and the outer ring member 4. The transmitter 30 is accommodated in a first recess 21 (recess) of the inner ring member 23. The first cover 60 (covering member) is supported by the outer ring member 4 and covers the inner side of the inner ring member 23 and the inner side of the transmitter 30 in the vehicle width direction. A first sealant 7 is provided to close the gap between the inner ring member 23 and the outer ring member 4.

The inner ring member 23 includes a hub 2 and an inner ring 3. The hub 2 has a cylindrical hub main body 2A extending in the axial direction, a flange portion 2B extending from the outer peripheral surface of the hub main body 2A toward the outer side in the radial direction, and a partition wall 2C extending from an inner peripheral surface in the middle of the hub main body 2A in the vehicle width direction toward the inner side in the radial direction.

A groove portion 2D recessed toward the inner side in the radial direction is formed on the outer periphery of the hub main body 2A closer to the inner side in the vehicle width direction. The inner ring 3 in an annular shape is fitted in the groove portion 2D and is integrated with the hub 2 to rotate together about the rotation axis AX. A vehicle wheel (not illustrated) is fixed to the flange portion 2B through a hub bolt 9. The hub 2 has two recesses extending along the vehicle width direction.

More specifically, the hub 2 has a first recess 21 (recess) that is open to the inner side in the vehicle width direction and extends toward the outer side in the vehicle width direction and a second recess 22 open to the outer side in the vehicle width direction and extends toward the inner side in the vehicle width direction. The first recess 21 and the second recess 22 are next to each other in the axial direction with the partition wall 2C disposed therebetween.

As illustrated in FIG. 3, the edge of the first recess 21 includes an inner peripheral surface 2E on the inner side of the hub 2 in the vehicle width direction and a side surface 2F on the inner side of the partition wall 2C in the vehicle width direction. The side surface 2F has a first groove portion 41 recessed toward the outer side in the vehicle width direction. The partition wall 2C has a through-hole 43 penetrating the partition wall 2C in the axial direction. The partition wall 2C extends toward the inner side in the radial direction and serves as a bottom of the first recess 21. The partition wall 2C has another side surface on the outer side in the vehicle width direction. The side surface has a second groove portion 42 recessed toward the inner side in the vehicle width direction. The second groove portion 42 accommodates the connection plate 50.

The outer ring member 4 (outer ring) is non-rotatable and disposed on the outer side (on the outer periphery side), in the radial direction, of both the hub 2 and the inner ring 3. The outer ring member 4 has a flange portion 4A to be connected to the suspension 10.

The rolling body 5 is disposed between the inner ring member 23 and the outer ring member 4. The rolling body 5 includes a plurality of rolling bodies 5A disposed between the hub main body 2A and the outer ring member 4, and a plurality of rolling bodies 5B disposed between the inner ring 3 and the outer ring member 4. The rolling bodies 5 are held by holders 5H.

In this embodiment, the rolling body 5 is a sphere. The rolling body 5 may also be a roller (tapered roller). For example, tapered rollers may be used as the rolling bodies 5 when the rolling bearing unit 1 is mounted on a heavy vehicle. The rolling body 5 is rollably disposed between the inner ring member 23 and the outer ring member 4 and rotatably supports the inner ring member 23 with respect to the outer ring member 4.

The outer peripheral surface of the inner ring member 23 has a first inner race 11 where a part of the outer surface of the rolling body 5A is positioned and a second inner race 13 where a part of the outer surface of the rolling body 5B is positioned. The inner peripheral surface of the outer ring member 4 has a first outer race 14 where another part of the outer surface of the rolling body 5A is positioned and a second outer race 15 where another part of the outer surface of the rolling body 5B is positioned. The rolling body 5A is disposed between the first inner race 11 and the first outer race 14, and the rolling body 5B is disposed between the second inner race 13 and the second outer race 15.

A gap is formed between an end part of the outer ring member 4 on the outer side in the vehicle width direction and the outer peripheral surface of the hub main body 2A. The gap separates the outer ring member 4 and the hub main body 2A in the axial direction and in the radial direction, and extends in the circumferential direction. In this embodiment, the first sealant 7 is provided at the end part of the outer ring member 4 on the outer side in the axial direction, thereby closing the gap. Similarly, a second sealant 8 is provided to the outer peripheral surface of the inner ring 3.

The first cover 60 (covering member) has a first portion 61, a second portion 62, a third portion 63, and a fourth portion 64. The first portion 61 in the form of a disc is disposed on the inner side in the radial direction. From the outer end of the first portion in the radial direction toward the outer side in the radial direction, the second portion 62 inclines toward the outer side in the vehicle width direction. The third portion 63 enlarges and extends from the outer end of the second portion 62 in the radial direction toward the outer side in the radial direction. The third portion 63 has an annular shape. The fourth portion 64 extends from the outer end of the third portion 63 in the radial direction toward the outer side in the vehicle width direction.

An annular third sealant 67 is provided on the fourth portion 64 along the circumferential direction. The first portion 61 has a circular through-hole 65 in the center thereof in the radial direction. The first portion 61 has a circular through-hole 65 in the center thereof in the radial direction, and the circular through-hole 65 receives a projection 36 of the transmitter 30 fitted thereto. The center axes of the through-hole 65 and the projection 36 coincide with or are in proximity to the rotation axis AX. Four bolt insertion holes 66 are formed at regular intervals in the circumferential direction on the outer periphery side of the through-hole 65.

The first cover 60 is mounted on the outer ring member 4 with the fourth portion 64 fitted on the inner peripheral surface of an end part of the outer ring member 4 on the inner side in the vehicle width direction. The first cover 60 is made of aluminum to reduce the weight of the unit.

As illustrated in FIG. 3, the second recess 22 of the inner ring member 23 has an opening OP on the outer side in the vehicle width direction, and a second cover 70 is fitted in the opening OP. The second cover 70 includes a substrate 71 having an interface circuit provided thereon, and closes the opening OP from the outer side in the vehicle width direction. An O-ring 72 is provided on the outer peripheral edge of the second cover 70. The O-ring 72 maintains sealing properties (airtightness and watertightness) of the outer peripheral edge of the second cover 70 and an end part of the inner ring member 23 on the outer side in the vehicle width direction. The substrate 71 is connected with a first wire 33 of the transmitter 30.

The transmitter 30 is a contact transmitter and includes a stationary-side transmission part 31 and a rotary-side transmission part 32. In the transmitter 30, a signal relating to the tire pressure and other information, electric power, and the like are conveyed between the stationary-side transmission part 31 and the rotary-side transmission part 32.

Although the transmitter 30 of the embodiment has a function of transmitting both electric power and a signal, the transmitter 30 may transmit one of the power and the signal. The transmitter 30 is accommodated in the first recess 21 (recess) of the hub 2 along the axial direction. The rotary-side transmission part 32 is connected with the first wire 33, and the stationary-side transmission part 31 is connected with a second wire 34.

An outer peripheral surface 31A of the stationary-side transmission part 31 around the rotation axis is formed as a cylindrical surface. The projection 36, a contact portion 37, a sealing member holding groove 39, and an outer peripheral flange 38 are provided on the inner side of the stationary-side transmission part 31 in the vehicle width direction (first side in the axial direction).

The projection 36 projects toward the inner side in the vehicle width direction and is fittable to the through-hole 65 of the first cover 60. The projection 36 is in the form of a disc, and the center axis thereof coincides with the rotation axis AX. The contact portion 37 is disposed on the outer side of the projection 36 in the radial direction and is formed in an annular shape.

The contact portion 37 has four blind holes 37A that each extend in the axial direction and are arranged at regular intervals in the circumferential direction. The blind hole 37A has a female thread at its inner peripheral surface. A bolt BL is inserted into the bolt insertion hole 66 of the first cover 60 and is fastened with its male thread mating with the inner peripheral surface of the blind hole 37A. The sealing member holding groove 39 accommodates therein an O-ring 35 (sealing member).

A procedure to assemble the transmitter 30 to the first cover 60 will now be shortly described. The O-ring 35 is placed in the sealing-member holding groove 39, and the projection 36 is fitted in the through-hole 65 of the first cover 60. The bolt insertion holes 66 of the first cover 60 and the blind holes 37A of the transmitter 30 are aligned with each other in the circumferential direction. The bolt BL is inserted into the bolt insertion hole 66 and the blind hole 37A and is turned therein.

The transmitter 30 is thus assembled to the first cover 60 through the bolt BL. With the transmitter 30 assembled on the first cover 60, the contact portion 37 of the transmitter 30 is in contact with the back surface of the first portion 61 of the first cover 60, and the O-ring 35 is pressed by the back surface of the first portion 61 and elastically deformed. The outer periphery side of the through-hole 65 and the bolt insertion hole 66 is therefore sealed in an annular shape.

As illustrated in FIG. 4, the connection plate 50 is a vertically elongated rectangular plate. The connection plate 50 has a pair of bolt insertion holes 51 and 52 vertically arranged, and has an insertion hole 53 in the center thereof in the vertical direction. The inner peripheral edge of the insertion hole 53 has a pair of arc portions 54 facing each other in the vehicle front-to-rear direction and a pair of linear portions 55 facing in the vertical direction.

The rotary-side transmission part 32 of the transmitter 30 has an outer shape corresponding to the inner peripheral edge of the insertion hole 53. Thus, inserting the first wire 33 and the rotary-side transmission part 32 in the insertion hole 53, and then inserting the bolts BL into the bolt insertion holes 51 and 52 and fastening them to the partition wall 2C allows the rotary-side transmission part 32 and the connection plate 50 to integrally rotate.

As described above, according to the embodiment, the stationary-side transmission part 31 (a part of the transmitter 30) included in the transmitter 30 is accommodated inside the first recess 21 (recess) of the inner ring member 23 along the axial direction, and thus the inner side of the inner ring member 23 in the vehicle width direction (first side in the axial direction) is kept from projecting in the vehicle width direction (axial direction). This can reduce the entire length of the rolling bearing unit 1 in the axial direction, thereby preventing an increase in the overall size of the rolling bearing unit 1.

According to the embodiment, the transmitter 30 is connected with the first cover 60 (covering member) with the projection 36 fitted in the through-hole 65, which enables effective holding of the transmitter 30. Since the inner ring member 23, which is a rotary member, is disposed on the outer periphery side of the transmitter 30, which is a stationary member, it is difficult to hold the transmitter 30. To address this, the transmitter 30 is connected with the first cover 60 (covering member), which is a stationary member. This structure enables effective holding of the transmitter 30.

Furthermore, according to the embodiment, the center axis of the transmitter 30 is along the rotation axis AX of the inner ring member 23. This alignment can reduce interference of the inner peripheral surface of the first recess 21 (recess) with the outer peripheral surface of the transmitter 30 during rotation of the inner ring member 23. Furthermore, this alignment can reduce the distance between the inner peripheral surface of the first recess 21 of the inner ring member 23 and the outer peripheral surface of the transmitter 30 in the radial direction, which allows the inner ring member 23 to have a larger thickness, thereby increasing the rigidity thereof.

The transmitter 30 has its center axis along the rotation axis AX of the inner ring member 23 with the projection 36 fitted in the through-hole 65. With this configuration, the center axis of the transmitter 30 can be aligned with the rotation axis AX of the inner ring member 23 by carrying out a simple task such as fitting the projection 36 of the transmitter 30 in the through-hole 65 of the first cover 60.

According to the embodiment, the O-ring 35 (sealing member) provides waterproof even when water enters through the gap between the projection 36 and the through-hole 65. With the projection 36 fitted in the through-hole 65, a gap can be produced between the projection 36 and the inner peripheral surface of the through-hole 65, and water can enter through the gap. The annular O-ring 35 (sealing member) is therefore interposed between the outer periphery side of the projection 36 and the outer periphery side of the through-hole 65 so as to increase the sealing properties (airtightness and watertightness). Thus, if water enters through the gap, the O-ring 35 can stop the water from further spreading to the outer peripheral side.

While the embodiment has been described as above, the embodiment is not limited to the content of description. For example, although in the embodiment, aluminum is used as a material of the first cover 60, the first cover 60 may be made of stainless steel. Use of stainless steel is advantageous in reducing corrosion, which would be caused by a snow melting agent. Use of resin is advantageous in further reducing the weight of the unit.

The invention claimed is:

1. A rolling bearing unit comprising:
    an inner ring member having a first recess on a first side in an axial direction along a rotation axis and a second recess on a second side opposite to the first side in the axial direction, the first recess being recessed toward the second side in the axial direction, the second recess being recessed toward the first side in the axial direction;
    an outer ring member disposed on an outer periphery side of the inner ring member;
    a rolling body disposed between the inner ring member and the outer ring member and rotatably supporting the inner ring member with respect to the outer ring member;
    a transmitter, at least a part of the transmitter being accommodated inside the first recess of the inner ring member;
    a covering member that is supported by the first side of the outer ring member in the axial direction, that covers the first side of the inner ring member in the axial direction, and that fixes the transmitter;
    a first through-hole in the inner ring member, the first through-hole passing through the first recess and the second recess in the axial direction;
    a connection plate connecting the transmitter and the inner ring member;
    a first wire; and
    a second wire,
    wherein
    the transmitter including
        a stationary-side transmission part and
        a rotary-side transmission part that is capable of transmitting at least one of electric power or a signal between the stationary-side transmission part and the rotary-side transmission part and that is disposed at the second side of the stationary-side transmission part in the axial direction,
    a projection is disposed at the first side of the stationary-side transmission part and protrudes toward the first side to overlap the rotation axis,
    the projection is connected to the second wire that extends to the first side in the axial direction,
    the rotary-side transmission part is coupled to the first wire that extends to the second side in the axial direction and inserted in the first through-hole and a insertion hole disposed in a center portion of the connection plate,
    the connection plate connects the inner ring member and the rotary-side transmission part.

2. The rolling bearing unit according to claim 1,
    wherein the covering member has
        a first portion disposed in a central portion in a radial direction, and
        a second through-hole overlapping the rotary axis of the first portion, a volt passes through a bolt insertion hole of the first portion,
    the transmitter has
    the projection fittable into the second through-hole of the covering member,
        a contact portion disposed outside the projection in the radial direction,
        and
        an outer peripheral flange disposed outside the contact portion in the radial direction,
    and
    the transmitter, having the contact portion in contact with a back surface of the first portion, is fixed to the covering member by the bolt with the projection fitted in the second through-hole.

3. The rolling bearing unit according to claim 2,
    wherein a center axis of the transmitter is along the rotation axis of the inner ring member with the projection fitted in the second through-hole.

4. The rolling bearing unit according to claim 2,
    wherein a sealing member annularly continuous around the rotation axis is interposed between: a sealing member holding groove disposed between the outer peripheral flange and the contact portion; and the back surface of the first portion, in the axial direction.

* * * * *